March 4, 1924.

A. LIESE

BICYCLE GEAR

Filed July 24, 1922

1,485,682

INVENTOR
AUGUSTUS LIESE.

BY *Featherstonehaugh & Co.*
ATTYS.

Patented Mar. 4, 1924.

1,485,682

UNITED STATES PATENT OFFICE.

AUGUSTUS LIESE, OF ROWE, MASSACHUSETTS.

BICYCLE GEAR.

Application filed July 24, 1922. Serial No. 577,169.

*To all whom it may concern:*

Be it known that I, AUGUSTUS LIESE, a citizen of the United States of America, and resident of Rowe, in the State of Massachusetts, United States of America, have invented certain new and useful Improvements in Bicycle Gears, of which the following is a specification.

This invention relates to improvements in bicycle gears, and the objects of the invention are to provide a relatively high gear for fast riding without the necessity of employing sprockets or gears of unduly increased size.

Further objects of the invention are generally to improve and simplify the construction of the gear to better adapt the various parts to perform the functions required of them.

And it consists essentially of the improved construction hereinafter described in detail in the accompanying specification and drawings.

In the drawings.

In the drawings, like characters of reference indicate corresponding parts in all the figures.

Figure 1:
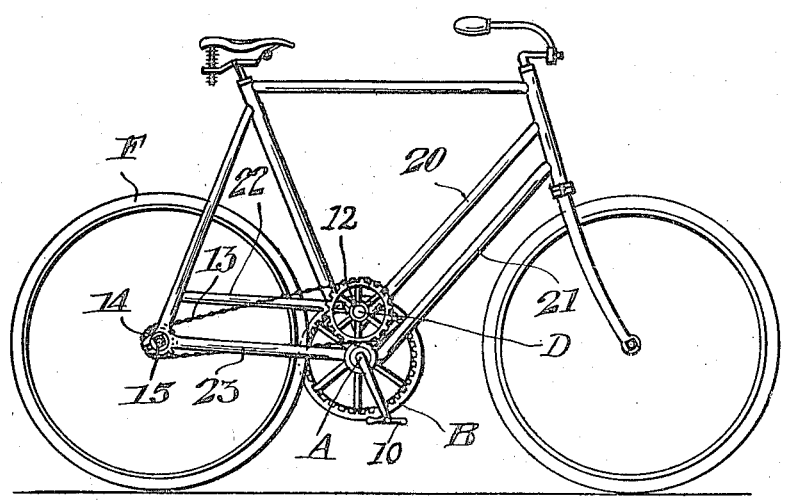
Figure 1 is a side elevation of the gear and of the bicycle showing the method of attaching the gear.
Figure 3:
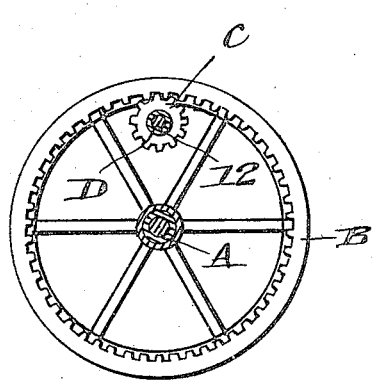
Figure 3 is a detail in elevation of the main driving gear.
Figure 2:
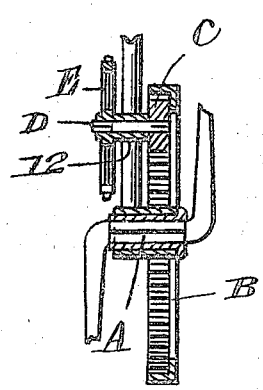
Figure 2 is a sectional detail of the gear.

Referring to the drawings;

A indicates the crank having the usual pedal 10 thereon. In accordance with the present invention the crank is operatively connected to an internal gear B which turns therewith and which meshes with a pinion C on a counter-shaft D journalled in a bearing 12 on the frame, the opposite end of the counter-shaft carrying a sprocket E which is connected by a chain 13 with a corresponding sprocket 14 which turns with the rear wheel F of the bracket and is preferably connected to the hub 15 thereof in the usual way.

The sprocket E is preferably larger than the sprocket 14 and the gear B is of a suitably larger size than the pinion C. It will be seen that, in this way, a very considerable multiplication of speed is obtained between the various gears, and this is accomplished by minimum parts all well designed to perform the functions required of them.

In order to strengthen the frame and enable it to better support the gear, I provide a second diagonal bar 20 parallel to the first diagonal bar 21 and provide a second horizontal bar 22 parallel to the lower horizontal bar 23, the bars 20 and 22 meeting at the bearing 12 which journals the counter-shaft D.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

A bicycle of the character described comprising a pair of diagonal bars spaced one above the other, a pair of similarly spaced horizontal bars connected at their inner ends to the diagonal bars to form an upper and lower frame, a counter-shaft supported in a bearing in the upper frame, a pinion and a sprocket on said shaft, a crank shaft in the lower frame having an internal gear adapted to engage with the pinion on the counter-shaft, and chain means connecting the sprocket on the counter-shaft with a sprocket on the driving wheel.

In witness whereof I have hereunto set my hand in the presence of two witnesses.

AUGUSTUS LIESE.

Witnesses:
J. B. BOLAND,
HOWARD LEE.